US007048076B2

(12) United States Patent

Cecchin et al.

(10) Patent No.: US 7,048,076 B2

(45) Date of Patent: May 23, 2006

(54) PERCUSSION ELECTRICAL HAND HELD TOOL

(75) Inventors: Holger Cecchin, Germering (DE); Christian Daubner, Mammendorf (DE); Hubert Daxenberger, Herrsching (DE); David Hruza, Bad Waldsee (DE); Christoph Kink, Stadtbergen (DE); Ferdinand Kristen, Gilching (DE); Erwin Manschitz, Germeriong (DE); Hans-Juergen Pfisterer, Karlsruhe (DE); Walter Wissmach, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/739,863

(22) Filed: Dec. 18, 2003

(65) Prior Publication Data

US 2004/0182589 A1 Sep. 23, 2004

(30) Foreign Application Priority Data

Dec. 19, 2002 (DE) ................................ 102 59 566

(51) Int. Cl.
*B23B 45/16* (2006.01)
*E21B 17/22* (2006.01)

(52) U.S. Cl. ....................................... 173/201; 173/216

(58) Field of Classification Search ................ 173/201, 173/109, 95, 117, 216, 217, 93.7, 112, 113, 173/145

See application file for complete search history.

(56) References Cited

U.S. PATENT DOCUMENTS

| | | | | |
|---|---|---|---|---|
| 3,828,865 | A * | 8/1974 | Schnizler, Jr. | 173/48 |
| 3,921,729 | A * | 11/1975 | Schmuck | 173/14 |
| 4,066,136 | A * | 1/1978 | Wanner et al. | 173/48 |
| 4,353,425 | A * | 10/1982 | Simpson | 173/109 |
| 4,462,467 | A * | 7/1984 | Weingartner | 173/105 |
| 6,209,659 | B1 * | 4/2001 | Blessing | 173/201 |
| 6,484,814 | B1 * | 11/2002 | Bongers-Ambrosius | 173/2 |
| 6,732,815 | B1 * | 5/2004 | Hanke et al. | 173/201 |
| 6,843,327 | B1 * | 1/2005 | Meixner et al. | 173/11 |
| 2004/0108124 | A1 * | 6/2004 | Kristen et al. | 173/217 |

* cited by examiner

*Primary Examiner*—Scott A. Smith
*Assistant Examiner*—Brian Nash
(74) *Attorney, Agent, or Firm*—Abelman, Frayne & Schwab

(57) ABSTRACT

An electrical hand-held tool includes an electric motor (2) having a rotor shaft (3) extending transverse to the tool percussion axis (A), a rotor sheet stack (4) supported on the rotor shaft, and a pinion (5) supported on the rotor shaft, a percussion mechanism (6) including an eccentric (7), and a drive gear (8) engageable with the motor pinion (5) for driving the eccentric (7), with the rotor sheet stack (4) being arranged, with respect to the percussion axis A, completely diametrically opposite the drive gear (8).

8 Claims, 1 Drawing Sheet

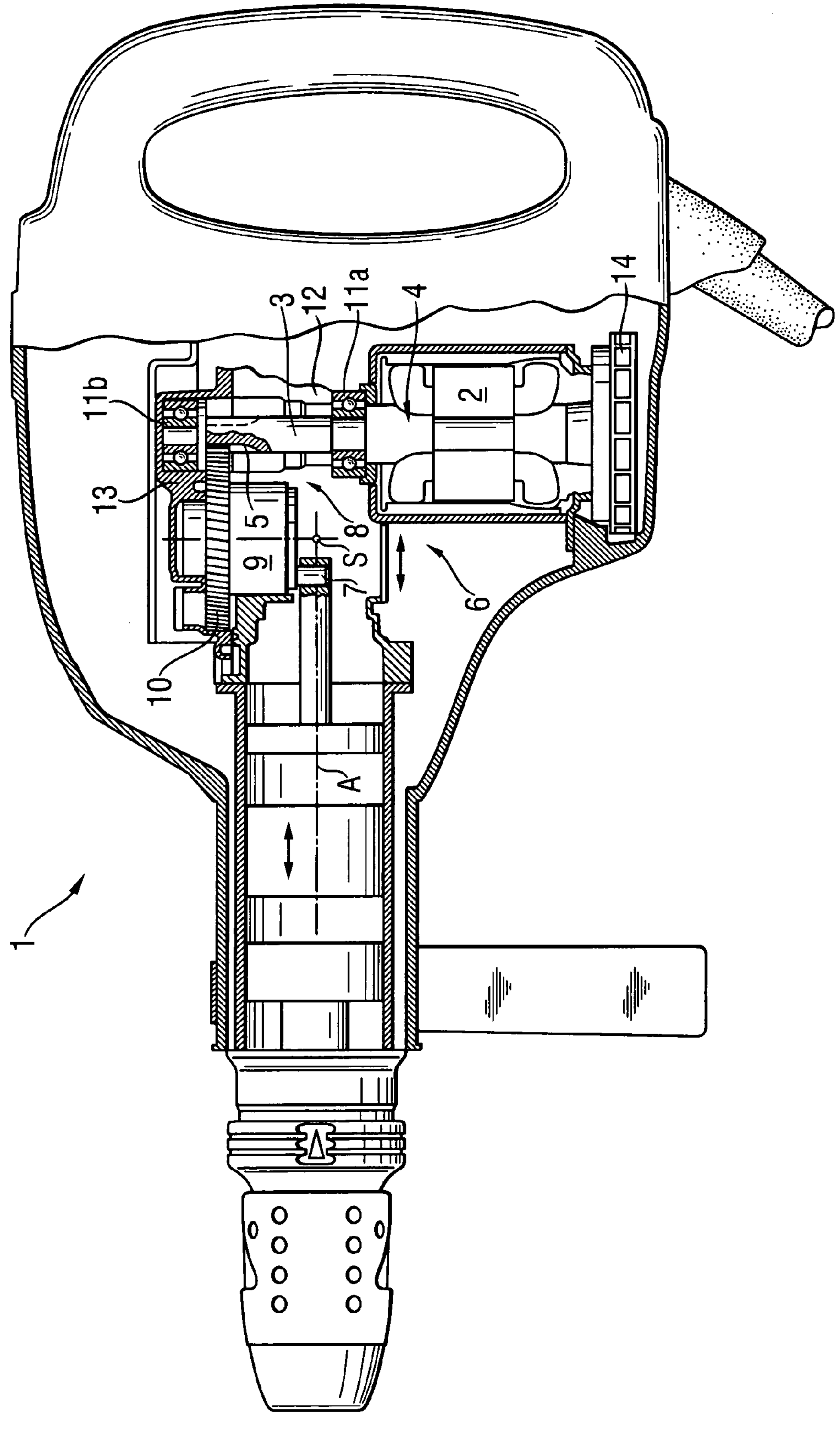
1
2
3
4
5
6
7
8
9
10
11a
11b
12
13
14
S
A

PERCUSSION ELECTRICAL HAND HELD TOOL

BACKGROUND OF THE INVENTION

1. Field of the Invention

The present invention relates to a percussion electrical hand-held tool such as a combihammer or a chisel hammer.

2. Description of the Prior Act

Percussion electrical hand-held tools, which apply blows to a working tool, because of their interaction with a workpiece and the hand-arm-system of the tool user, and because of the mass and stiffness distribution, have a very complex self-excitation. The resulting self-vibrations, in particular in the region of the tool handle, should be suppressed to a most possible extent. The technical expenditure associated with passive damping or active controlled vibration suspending systems, increases with complexity of the to-be-compensated self-excitation.

European Publication EP-0107628 discloses a chisel hammer having a reluctance motor freely projecting along a rotor axis forming an extension of an eccentric of the percussion mechanism, i.e., the motor is arranged completely on one side of the percussion axis. In this chisel hammer, the center of gravity, which is offset from the percussion axis toward the reluctance motor leads, as a result of interaction with a workpiece and with the hand-arm-system of the user, to bending torques, which are very complex and differ from axial vibrations. In addition, the reluctance motor, which is directly connected with the eccentric, necessarily rotates slowly and, as a result, has a high, for a reluctance motor, mass/power ratio.

European Publication EP-1238759 discloses a chisel hammer having a percussion mechanism, and a symmetrical, to a most possible extent, with respect to the percussion axis, radial mass distribution. In this chisel hammer, the percussion mechanism drive gear is arranged, with respect to the percussion axis, diametrically relative to a portion of the motor. The space requirement of the motor in the core region of the percussion axis necessitates constructively a large axial spacing from the eccentric, which leads to generation of bending torques.

Accordingly, an object of the invention is a percussion electrical hand-held tool having an analytically simple, to a most possible extent, excitation.

SUMMARY OF THE INVENTION

This and other objects of the present invention, which will become apparent hereinafter, are achieved by providing an electrical-hand tool having a percussion axis along which blows are applied to a working tool and including an electric motor having a rotor shaft extending transverse to the percussion axis, a rotor sheet stack supported on the rotor shaft, and a pinion supported on the rotor shaft, a percussion mechanism including an eccentric, and a drive gear engageable with the motor pinion for driving the eccentric, with the rotor sheet stack being arranged with respect to the percussion axis, completely diametrically opposite the drive gear.

With the rotor sheet stack being arranged completely diametrically opposite the drive gear, only the rotor shaft crosses the core region of the percussion axis. The electric motor is arranged close to the eccentric and this, together with a most possible symmetrical, with respect to the percussion axis, mass distribution, leads to smaller bending torques.

Advantageously, the rotor shaft is arranged immediately adjacent to the crank-shaft of the eccentric. The eccentric pinion forms part of the drive gear and directly engages the motor pinion mounted on the rotor shaft. Therefor, the rotor shaft is spaced from the crank-shaft by only a distance equal to the radii of both pinions.

Advantageously, the eccentric pinion is formed as an outer pinion of the crank-shaft or, alternatively, as an inner pinion of the hollow crank-shaft. Thus, the distance between the two shafts is determined by the sum or the difference of the two radii.

Advantageously, the rotor shaft, which supports the electric motor is supported in two bearings arranged in the gear drive. Preferably, the electric motor is supported with one of the two bearings located in the drive gear housing, and with another of the two bearings located in the bearing cap. Optionally the bearings are formed of a light, die casting aluminum. The support of the rotor shaft insures a precise guidance of the motor pinion.

Advantageously, the rotor shaft with the rotor sheet stack is formed as a freely projecting part. This eliminates a need in a heavy bearing on the sheet stack side of the rotor shaft. As a result the center of gravity of the motor is shifted toward the percussion axis.

Advantageously, a light-weight impeller is arranged at an end of the rotor shaft adjacent to an end surface of the rotor sheet stack remote from the percussion axis. Thereby, the constructional space adjacent to the percussion axis is not used. This, together with a freely projecting rotor sheet stack, and absence of the stack side bearing, significantly simplifies the shape of the motor housing.

Advantageously, the electric motor is formed as a brushless motor, preferably, as a reluctance motor, which provides for a high power/mass ration.

Advantageously, the percussion mechanism and the electric motor have a common center of gravity which lies on the percussion axis. This results in analytically simple excitations.

The novel features of the present invention, which are considered as characteristic for the invention, are set forth in the appended claims. The invention itself, however, both as to its construction and its mode of operation, together with additional advantages and objects thereof, will be best understood from the following detailed description of a preferred embodiment, when read with reference to the accompanying drawings.

BRIEF DESCRIPTION OF THE DRAWINGS

Single FIGURE of the drawings shows a side, partially cross-sectional view of a percussion electrical hand-held tool according to the present invention.

DETAILED DESCRIPTION OF THE PREFERRED EMBODIMENT

A percussion electrical hand-held tool 1 according to the present invention, which is shown in the drawing, includes an electric motor 2 which is formed as a reluctance motor and has a rotor shaft 3 extending transverse to a percussion axis A along which blow are applied by a tool percussion mechanism 6. Rotor sheet stack 4 is supported on the rotor shaft 3. The percussion mechanism 6 includes an eccentric 7 and a drive gear 8 for driving the eccentric 7 supported on crankshaft 9. The drive gear 8 is located completely on one side of the percussion axis and includes an outer eccentric pinion 10 engaging a pinion 5 supported on the rotor shaft 3. The rotor sheet stack 4 is arranged, with respect to the percussion axis A, opposite the drive gear 8 on another side of the percussion axis. The outer eccentric pinion 10 is supported on crankshaft 9. The electric motor 2 is supported with its rotor shaft 3 that is supported by two bearings 11*a* and 11*b* provided in the drive gear 8. The bearings, 11*a*, 11*b* are formed of a light die casting aluminum. The bearing 11*a* is arranged in a drive gear housing 12, and the bearing 11*b* is arranged in a bearing cap 13.

The rotor shaft 3, together with the rotor sheet stack 4, is formed as a projecting part, so that an end of the rotor shaft 3 remote from the percussion axis A hangs freely, without being supported. A light-weight impeller 14 is arranged on the free end of the motor shaft 3. The drive gear 8 is arranged, with respect to the percussion axis A, by 90% diametrically opposite the electric motor 2, i.e., with the electric motor rotor stack (4) being arranged on one side of the percussion axis A, drive gear 8 is arranged on the opposite side of the percussion axis A. As a result of such an arrangement, the common center of gravity S of the percussion mechanism 6 and the electric motor 2 lies on the percussion axis A.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A percussion electrical hand-held tool, comprising a percussion mechanism (6) for applying blows along a percussion axis (A) and including an eccentric (7); a drive gear (8) for driving the percussion mechanism (6) and arranged completely on one side of the percussion axis (A); and an electric motor (2) for driving the drive gear (8) and having a rotor shaft (3) extending transverse to the percussion axis (A), a rotor sheet stack (4) supported on the rotor shaft (3) and located completely on another side of the percussion axis (A), and a pinion (5) supported on the rotor shaft (3) in a spaced relationship to the rotor sheet stack (4), located on the one side of the percussion axis, and forming a part of the drive gear (8).

2. An electrical hand-held tool according to claim 1, wherein the percussion mechanism (6) comprises a crankshaft (9) on which the eccentric (7) is supported, the rotor shaft (3) being arranged immediately adjacent to the crankshaft (9), and wherein the drive gear (8) includes an eccentric pinion (10) and the motor pinion (5).

3. An electrical hand-held tool according to claim 1, wherein the rotor shaft (3), which supports the electric motor (2), is supported in two bearings (11*a*), 11*b*) arranged in the drive gear (8).

4. An electrical hand-held tool according to claim 3, wherein one of the two bearings (11*a*) is supported in the drive gear housing (12), and another of the two bearings (11*b*) is supported in a bearing cap (13).

5. An electrical hand-held tool according to claim 1, wherein the rotor shaft (3), together with the rotor sheet stack (4), are formed as a projecting part, with rotor shaft (3) being supported only at one end thereof adjacent to the percussion axis (A).

6. An electrical hand-held tool according to claim 1, further comprising an impeller (14) arranged at an end of the rotor shaft (3) adjacent to an end surface of the rotor sheet stack remote from the percussion axis.

7. An electrical hand-held tool according to claim 1, wherein the electric motor (2) is formed as a brushless motor.

8. An electrical hand-held tool according to claim 1, wherein the percussion mechanism (6) and the electric motor (2) have a common center of gravity (S) lying on the percussion axis (A).

* * * * *